UNITED STATES PATENT OFFICE.

FRANCIS E. GALLAGHER, OF NEWTON, AND HARRY S. MORK, OF BOSTON, MASSACHUSETTS, ASSIGNORS TO STANDARD ALCOHOL COMPANY, OF NEW YORK, N. Y., A CORPORATION OF MAINE.

PROCESS OF PRODUCING FERMENTABLE SUGARS.

1,056,163. Specification of Letters Patent. Patented Mar. 18, 1913.

No Drawing. Application filed July 12, 1912. Serial No. 709,570.

*To all whom it may concern:*

Be it known that we, (1) FRANCIS E. GALLAGHER and (2) HARRY S. MORK, citizens of the United States, residing at (1) Newton and (2) Boston, in the counties of (1) Middlesex and (2) Suffolk, and State of (1 and 2) Massachusetts, have invented certain new and useful Improvements in Processes of Producing Fermentable Sugars, of which the following is a specification.

This invention relates to the production of fermentable sugars from ligno-cellulose by the agency of chlorin, either introduced as such or generated in presence of the cellulose to be converted, and used either alone or in conjunction with a mineral acid.

The invention may be practised by the use of free chlorin, either as a gas or dissolved in water, or by the use of a mixture of hydrochloric and nitric acids. Chlorin possesses a strongly inhibitive action upon yeast, and it is therefore essential that any free chlorin should be eliminated after the digestion has been completed and before the introduction of the yeast. This is most conveniently accomplished by the use of so-called "antichlors", preferably sodium thiosulfate. The digestion is preferably effected by steam under a pressure of 60 to 135 pounds per square inch, and may require from ten to sixty minutes.

Example I: Sawdust was moistened with chlorin water in such proportion that the chlorin present amounted to 0.2 per cent. by weight of the dry sawdust. The mixture was then cooked in a closed digester for 30 minutes under 135 pounds pressure of steam, whereupon it was found to contain 26.7 per cent. of total soluble materials and 18.4 per cent. of reducing sugars, based upon the dry weight of sawdust used.

Example II: A similar digestion in which 1.17 per cent. of hydrochloric acid and 1.13 per cent. of nitric acid were used yielded total solids equal to 32.1 per cent. and reducing sugars equal to 26.2 per cent., all percentages based on the weight of dry sawdust.

Instead of using chlorin directly as a hydrolyzing agent, it may be used as a preparatory reagent for the hydrolysis proper. The decomposing effect of chlorin upon ligno-cellulose even in the cold is well known, but we have found that the nature of this effect is such that when the ligno-cellulose is subsequently hydrolyzed by mineral acids, the results are materially better than are obtainable by use of the hydrolyzing acid alone under otherwise similar conditions.

Example III: Sawdust was subjected at ordinary temperatures for several hours to the action of free chlorin. It was then digested, without previous washing, with approximately one per cent. of its weight of sulfuric acid in highly dilute solution, the digestion being continued for 30 minutes under 135 pounds steam pressure. The yield, expressed in percentages of the dry sawdust, was 28.1 per cent. of total soluble matters, of which 25.2 per cent. consisted of reducing sugars. A further test in which the chlorinated product was washed before digestion with sulfuric acid gave materially lower results, comparable with those afforded by sulfuric acid alone.

We claim:

1. In a process of producing fermentable sugars from ligno-cellulose, the step which consists in effecting the hydrolysis through the agency of free chlorin.

2. In a process of producing fermentable sugars from ligno-cellulose, the steps which consist in chlorinating the ligno-cellulose, and subjecting the chlorinated material to the action of a hydrolyzing acid.

3. In a process of producing fermentable sugars from ligno-cellulose, the steps which consist in chlorinating the ligno-cellulose, and subjecting the chlorinated material to the action of sulfuric acid.

4. In a process of producing fermentable sugars from ligno-cellulose, the steps which consist in chlorinating the ligno-cellulose, and then digesting the chlorinated material by the direct action of steam under pressure in presence of a hydrolyzing acid.

5. In a process of producing fermentable sugars from ligno-cellulose, the steps which consist in chlorinating the ligno-cellulose, and then digesting the chlorinated material by the direct action of steam under pressure in presence of sulfuric acid.

In testimony whereof, we affix our signatures in presence of two witnesses.

FRANCIS E. GALLAGHER.
HARRY S. MORK.

Witnesses:
ARTHUR D. LITTLE,
AMY MONTGOMERY.